US011603768B2

(12) United States Patent
Lee et al.

(10) Patent No.: US 11,603,768 B2
(45) Date of Patent: Mar. 14, 2023

(54) LINER COOLING DEVICE, COMBUSTOR INCLUDING SAME, AND GAS TURBINE INCLUDING SAME

(71) Applicant: DOOSAN ENERBILITY CO., LTD., Changwon (KR)

(72) Inventors: Dong Gon Lee, Seoul (KR); Jae Won Seo, Changwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 30 days.

(21) Appl. No.: 17/184,621

(22) Filed: Feb. 25, 2021

(65) Prior Publication Data

US 2021/0270185 A1 Sep. 2, 2021

(30) Foreign Application Priority Data

Mar. 2, 2020 (KR) .................. 10-2020-0026104

(51) Int. Cl.
*F01D 9/02* (2006.01)
*F23R 3/00* (2006.01)
*F23R 3/60* (2006.01)

(52) U.S. Cl.
CPC .............. *F01D 9/023* (2013.01); *F23R 3/002* (2013.01); *F23R 3/60* (2013.01); *F23R 2900/00012* (2013.01)

(58) Field of Classification Search
CPC ....................................................... F01D 9/023
See application file for complete search history.

(56) References Cited

U.S. PATENT DOCUMENTS

| 2010/0229564 A1* | 9/2010 | Chila ................ F23R 3/06 60/752 |
| 2012/0186269 A1* | 7/2012 | Cihlar ............ F01D 9/023 60/796 |
| 2014/0047845 A1* | 2/2014 | Kodukulla ............ F23R 3/08 60/754 |

FOREIGN PATENT DOCUMENTS

| JP | 2007225180 | 9/2007 |
| JP | 2009085222 | 4/2009 |
| JP | 2010209912 | 9/2010 |

* cited by examiner

*Primary Examiner* — Katheryn A Malatek
*Assistant Examiner* — Alyson J. Harrington
(74) *Attorney, Agent, or Firm* — Harvest IP Law LLP

(57) ABSTRACT

A liner cooling device for cooling a liner of a gas turbine is provided. The liner cooling device may include a support portion disposed between a liner and a transition piece of a gas turbine and configured to include a cooling flow passage through which cooling air moves to the transition piece. The support portion includes a support member disposed between the liner and the transition piece and an auxiliary support member disposed in the cooling flow passage and having a hole through which the cooling air passes.

18 Claims, 10 Drawing Sheets

123

125

LINER COOLING DEVICE, COMBUSTOR INCLUDING SAME, AND GAS TURBINE INCLUDING SAME

CROSS REFERENCE TO RELATED APPLICATION

This application claims priority to Korean Patent Application No. 10-2020-0026104, filed on Mar. 2, 2020, the disclosure of which is incorporated herein by reference in its entirety.

BACKGROUND

1. Technical Field

Apparatuses and methods consistent with exemplary embodiments relate to a liner cooling device, a combustor including the apparatus, and a gas turbine including the combustor, and more particularly, to a liner cooling device for cooling an end portion of a liner, a combustor for combusting fuel with compressed air supplied from a compressor, and a gas turbine including the combustor.

2. Description of the Related Art

A gas turbine includes a compressor, a combustor, and a turbine.

The compressor includes a plurality of compressor vanes and a plurality of compressor blades that are alternately arranged in a compressor casing. The compressor includes a compressor inlet scroll strut into which air is introduced. The air introduced into the compressor casing is compressed by the plurality of compressor vanes and the plurality of compressor blades while passing through the compressor.

The combustor mixes fuel with air compressed by the compressor and ignites the fuel-air mixture with an igniter to generate high-temperature and high-pressure combustion gas which is supplied to the turbine.

The turbine includes a plurality of turbine vanes and a plurality of turbine blades that are alternately arranged in a turbine casing. The turbine receives the combustion gas generated by the combustor. The combustion gas introduced into the turbine casing rotates the turbine blades while passing through the turbine and flows out of the turbine through a turbine diffuser.

The gas turbine includes a tie rod. The tie rod is installed to extend through a central hole of a compressor rotor disk retaining the compressor blades coupled to an outer surface thereof and a central hole of a turbine disk retaining the turbine blades coupled to an outer surface thereof. Accordingly, the tie rod allows the compressor rotor disk and the turbine disk to be fixed in the turbine casing of the gas turbine.

Because the gas turbine does not have a reciprocating mechanism such as a piston which is usually provided in a four-stroke engine, there is no frictional part such as a piston-cylinder, thereby considerably reducing the consumption of lubricant. Therefore, the gas turbine has an advantage of generating a high capacity of power because it performs a high-speed operation due to a small stroke that is a characteristic of a reciprocating machine.

The combustor includes a liner for combusting a mixture of fuel and compressed air, a transition piece for supplying combustion gas to the turbine, and a liner cooling device installed between the liner and the transition piece to cool an end of the liner using compressed air. In addition, the liner cooling device includes a cooling channel for discharging compressed air to a downstream side based on a flow direction of the combustion gas flowing through the liner.

However, related art liner cooling devices have a problem in that the compressed air discharged through the cooling channel forms a vortex at the downstream end of the liner, resulting in the combustion gas being stagnant.

SUMMARY

Aspects of one or more exemplary embodiments provide a liner cooling device capable of preventing compressed air discharged from a cooling channel from forming a vortex on a downstream side of a liner.

Additional aspects will be set forth in part in the description which follows and, in part, will become apparent from the description, or may be learned by practice of the exemplary embodiments.

According to an aspect of an exemplary embodiment, there is provided a liner cooling device including: a support portion disposed between a liner and a transition piece of a gas turbine and configured to include a cooling flow passage through which cooling air moves to the transition piece. The support portion may include a support member disposed between the liner and the transition piece and an auxiliary support member disposed in the cooling flow passage and having a hole through which the cooling air passes.

According to an aspect of another exemplary embodiment, there is provided a combustor including: a nozzle configured to inject fuel to mix with compressed air supplied from a compressor of a gas turbine; a liner coupled to the nozzle and configured to combust a mixture of the fuel and the compressed air; a transition piece coupled to the liner and configured to pass combustion gas generated in the liner; and a liner cooling device installed at a joint portion between the liner and the transition piece to cool the liner. The liner cooling device may include a support portion disposed between the liner and the transition piece and configured to include a cooling flow passage through which cooling air moves to the transition piece. The support portion may include a support member disposed between the liner and the transition piece and an auxiliary support member disposed in the cooling flow passage and having a hole through which the cooling air passes.

According to an aspect of another exemplary embodiment, there is provided a gas turbine including: a compressor configured to compress air introduced from an outside; a combustor configured to mix fuel with the air compressed by the compressor and combust a mixture of the and the compressed air; and a turbine configured to generate a driving force to generate electric power by combustion gas supplied from the combustor. The combustor may include: a nozzle configured to inject fuel to mix with the compressed air supplied from the compressor; a liner coupled to the nozzle and configured to combust the mixture of the fuel and the compressed air; a transition piece coupled to the liner and configured to pass combustion gas generated in the liner; and a liner cooling device installed at a joint portion between the liner and the transition piece to cool the liner. The liner cooling device may include a support portion disposed between the liner and the transition piece and configured to include a cooling flow passage through which cooling air moves to the transition piece. The support portion may include a support member disposed between the liner and the transition piece and an auxiliary support member disposed in the cooling flow passage and having a hole through which the cooling air passes.

The liner may include an inner liner and an outer liner. The outer liner may be disposed outside the inner liner in a radial direction and configured to surround the inner liner such that an air channel is defined between the inner liner and the outer liner to allow the cooling air to flow in a direction opposite to a flow direction of combustion gas. The transition piece may include: an inner transition piece having an upstream end disposed outside a downstream end of the inner liner in the radial direction based on the flow direction of the combustion gas; and an outer transition piece disposed outside the inner transition piece in the radial direction and coupled to the outer liner such that an air channel is defined between the inner transition piece and the outer transition piece to allow the cooling air to flow toward the liner. The support portion may be disposed between the downstream end of the inner liner and the upstream end of the inner transition piece in the flow direction of the combustion gas.

The support member may be spaced from an outer surface of the liner in the radial direction to define a cooling flow passage between the support member and the liner, and the auxiliary support member may be disposed between the support member and the liner to support the support member.

An upstream end of the support member based on the flow direction of the combustion gas may protrude more upstream than an end portion of the transition piece and may be provided with an inlet communicating with the cooling flow passage. The support portion may further include a partition wall installed at an upstream side of the inlet of the cooling flow passage, configured to support the support member, and formed to seal an upstream end of the cooling flow passage. The auxiliary support member may be installed at a downstream side of the cooling flow passage.

The liner cooling device may further include a sealing portion disposed between the support member and the transition piece and positioned at a downstream side of the inlet based on the flow direction of the combustion gas.

The auxiliary support member may be formed to protrude radially outward from the liner when viewed in the flow direction of the combustion gas to form a space between the auxiliary support member and the liner.

The auxiliary support member may include: a first support protruding radially outward from the liner when viewed in the flow direction of the combustion gas; and a pair of second supports extending in opposite directions from each end of the first support along a circumferential direction of the liner.

The auxiliary support member may include a circular hole when viewed in the flow direction of the combustion gas.

The auxiliary support member may include an elliptical hole when viewed in the flow direction of the combustion gas and a miner axis of the elliptical hole may be aligned along a radial direction of the liner.

The liner may include an auxiliary discharge flow passage communicating with the cooling flow passage and allowing the cooling air to be discharged from a downstream end of the liner in the flow direction of the combustion gas.

The auxiliary discharge flow passage may be inclined from an upstream end to a downstream end thereof in the flow direction of the combustion gas such that the auxiliary discharge flow passage obliquely extends radially inward from the cooling flow passage.

The auxiliary discharge flow passage may be formed such that a width thereof in a circumferential direction of the liner increases from an upstream end to a downstream end in the flow direction of the combustion gas.

The auxiliary discharge flow passage may be formed such that a width thereof in a radial direction of the liner increases from an upstream end to a downstream end in the flow direction of the combustion gas.

The liner cooling device, the combustor, and the gas turbine according to one or more exemplary embodiments are structured to include a support member and an auxiliary support member. The support member defines a cooling flow passage between an inner liner and the support member. The auxiliary support member is disposed between the support member and the inner liner to support the support member. The auxiliary support member is formed to have a hole to prevent compressed air discharged from the cooling flow passage from forming a vortex and to prevent combustion gas from staying when flowing from the liner to the transition piece.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
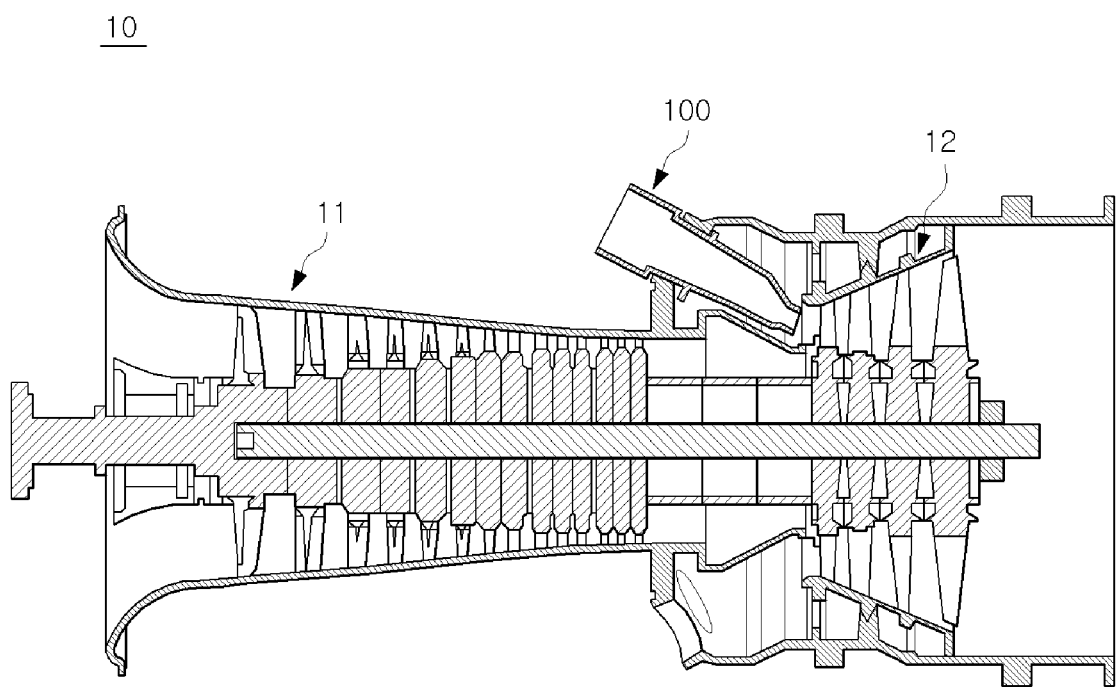
FIG. 1 is a cross-sectional view of a gas turbine according to an exemplary embodiment.

Various modifications may be made to the embodiments of the disclosure, and there may be various types of embodiments. Thus, specific embodiments will be illustrated in the accompanying drawings and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used herein is for the purpose of describing particular embodiments only and is not intended to limit the scope of the disclosure. As used herein, the singular forms "a", "an", and "the" are intended to include the plural forms as well, unless the context clearly indicates otherwise. In this specification, terms such as "comprise", "include", or "have/has" should be construed as designating that there are such features, integers, steps, operations, elements, components, and/or a combination thereof in the specification, not to exclude the presence or possibility of adding one or more of other features, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, a liner cooling device, a combustor, and a gas turbine according to exemplary embodiments will be described with reference to the accompanying drawings. In order to clearly illustrate the disclosure in the drawings, some of the elements that are not essential to the complete understanding of the disclosure may be omitted, and like reference numerals refer to like elements throughout the specification.

Figure 2:
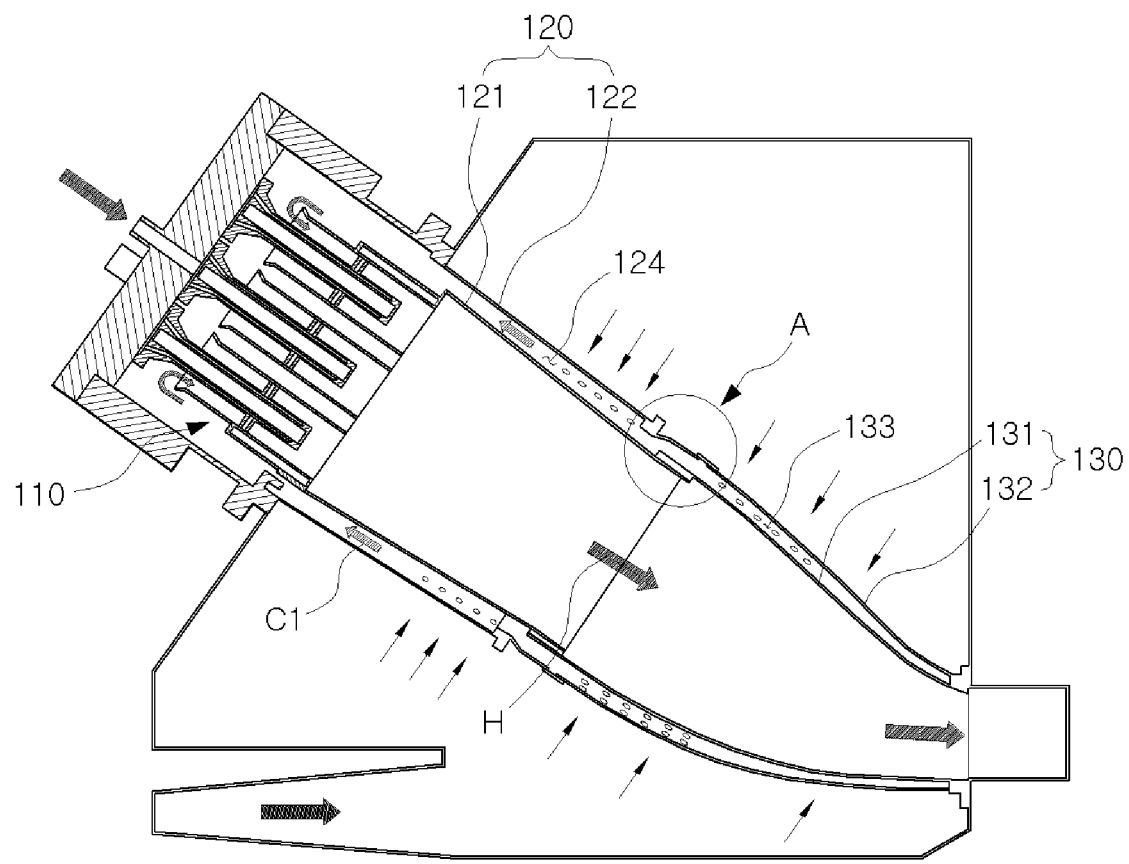
FIG. 2 is a cross-sectional view of a combustor illustrated in FIG. 1.

FIG. 1 is a cross-sectional view of a gas turbine according to an exemplary embodiment, and FIG. 2 is a cross-sectional view of a combustor illustrated in FIG. 1.

Referring to FIG. 1, a gas turbine 10 includes a compressor 11, a combustor 100, and a turbine 12. In a flow direction of gas (e.g., compressed air or combustion gas) in the gas turbine 10, the compressor 11 is disposed at an upstream side and the turbine 12 is disposed at a downstream side. The combustor 100 is disposed between the compressor 11 and the turbine 12.

The compressor 11 includes compressor vanes and compressor rotors that are accommodated in a compressor casing, and the turbine 12 includes turbine vanes and turbine rotors that are accommodated in a turbine casing. The compressor vanes and the compressor rotors are arranged in a multi-stage arrangement along the flow direction of compressed air, and the turbine vanes and the turbine rotors are also arranged in a multi-stage arrangement along the flow direction of combustion gas. The compressor 11 is designed such that an internal space is gradually decreased in size from a front stage to a rear stage so that air drawn into the compressor 11 can be compressed. On the contrary, the turbine 12 is designed such that an internal space is gradually increased in size from a front stage to a rear stage so that combustion gas received from the combustor 100 can expand.

A torque tube for transmitting a rotational torque generated from the turbine 12 to the compressor 11 is disposed between a compressor rotor that is located at the rearmost stage of the compressor 11 and a turbine rotor that is located at the foremost stage of the turbine 12. FIG. 1 illustrates a case in which the torque tube includes a plurality of torque tube disks arranged in a three-stage arrangement, but it is understood that this is only an example and other exemplary embodiments are not limited thereto. For example, the torque tube may include multiple torque tube disks arranged in an arrangement of equal to or greater than four stages or an arrangement of equal to or less than two stages.

Each of the compressor rotor includes compressor rotor disk and compressor blades fastened to the compressor disk. That is, the compressor 11 includes a plurality of compressor rotor disks disposed in the compressor casing, and the compressor rotor disks are coupled to each other by a tie road to prevent axial separation in an axial direction. The compressor rotor disks are arranged in the axial direction with the tie rod extending through centers of the compressor rotor disks. Adjacent compressor rotor disks are arranged such that opposing surfaces thereof are in tight contact with each other by being tightly fastened by the tie rod so that the adjacent compressor rotor disks cannot rotate relative to each other.

The compressor blades are radially coupled to an outer surface of each of the compressor rotor disks along a circumferential direction. The compressor vanes coupled to an inner surface of the compressor casing along a circumferential direction are alternately arranged with the compressor blades in each stage. While the compressor blades rotate along with a rotation of the tie rod, the compressor vanes are fixed to the compressor casing so as not to rotate. The compressor vanes guide the flow of compressed air moved from front-stage compressor blades to rear-stage compressor blades. Herein, the compressor casing and the compressor vanes may be collectively referred to as a "compressor stator" so as to be distinguished from the compressor rotors.

The tie rod is installed to extend through centers of the multiple compressor rotor disks and the multiple turbine disks, one end of the tie rod is fastened to a compressor rotor disk located at the foremost stage of the compressor 11, and an opposite end is fastened in the torque tube by a fixing nut.

It is understood that the tie rod is not limited to the example illustrated in FIG. 1 and may be changed or vary according to one or more other exemplary embodiments. For example, there are three types of tie rods: a single-type in which a single tie rod extends through the centers of the respective compressor rotor disks and the centers of the respective turbine rotor disks; a multi-type in which multiple tie rods are arranged in a circumferential direction; and a complex type in which the single-type and the multi-type are combined.

Also, the compressor 11 of the gas turbine 10 is provided with a deswirler serving as a guide blade to adjust an actual inflow angle of the fluid entering into an inlet of the combustor 100 to a designed inflow angle.

The combustor 100 mixes the introduced compressed air with fuel and burns the air-fuel mixture to produce high-temperature and high-pressure combustion gas. The combustor 100 increases, through a constant pressure combustion process, the temperature of the combustion gas to a heat-resistant temperature limit at which components of the combustor and components of turbine can endure.

Referring to FIG. 2, a plurality of combustors constituting a combustion system of a gas turbine are arranged in a combustor casing in a cell shape. Each of the combustors 100 includes a nozzle 110 for injecting fuel, a liner 120 defining a combustion chamber, a transition piece 130 serving as a connector between the combustor 100 and the turbine 12, and a liner cooling device 1000 installed at a joint portion between the liner 120 and the transition piece 130 to cool an end portion of the liner 120.

The liner 120 defines the combustion chamber in which the fuel injected through the nozzle 110 and the compressed air supplied from the compressor are mixed and burned. That is, the liner 120 includes a combustion chamber providing a combustion space in which the fuel mixed with the compressed air is combusted and an annular liner flow passage 124 that is an annular space surrounding the combustion chamber. The nozzle 110 for injecting fuel is coupled to a front end of the liner, and an igniter is coupled to a sidewall of the liner.

The liner 120 includes an inner liner 121 and an outer liner 122. The inner liner 121 defines the combustion chamber, and the combustion gas generated in the combustion chamber moves through the inner liner 121. The outer liner 122 is disposed outside the inner liner 121 while surrounding the inner liner 121. The annular liner flow passage 124 through which the compressed air supplied from the compressor 11 flows is defined between the inner liner 121 and the outer liner 122. The compressed air supplied to the annular liner flow passage 124 flows in a direction C1 that is opposite to a flow direction H of the combustion gas which flows inside the inner liner 121.

The compressed air flowing along the annular liner flow passage 124 prevents the liner 120 from being damaged by heat generated in the combustion chamber.

A rear end of the liner 120, that is, the downstream end of the liner 120 in the flow direction H of the combustion gas, is connected to the transition piece 130 that transfers the combustion gas to the turbine 12. The transition piece 130 includes an annular transition piece flow passage 133 surrounding an inner space thereof. The compressed air flowing along the annular transition piece flow passage 133 cools the transition piece 130, thereby preventing the transition piece 130 from being damaged by high-temperature combustion gas.

The transition piece 130 includes an inner transition piece 131 and an outer transition piece 132. An upstream end of the inner transition piece 131 based on the flow direction H of the combustion gas is disposed radially outside the downstream end of the inner liner 121. Thus, the combustion gas flows into the turbine through the inner liner 121 and the inner transition piece 131. The outer transition piece 132 is disposed radially outside the inner transition piece 131 while surrounding the inner transition piece 131, and is coupled to the outer liner 122. The annular transition piece flow passage 133 is formed between the inner transition piece 131 and the outer transition piece 132. The compressed air flowing in the direction C1 opposite to the flow direction H of the combustion gas is supplied to the annular liner flow passage 124.

The high-temperature and high-pressure combustion gas supplied from the combustor 100 flows into the turbine 12 and expands while passing through the inside of the turbine, thereby applying an impulsive force or reaction force to the turbine blades to generate a torque. A portion of the torque is transmitted to the compressor through the torque tube, and a remaining portion of the torque is used to drive a generator or the like.

The turbine 12 is substantially similar to the compressor in structure. That is, the turbine 12 includes multiple turbine rotors similar to the compressor rotors. The turbine rotor includes a turbine rotor disk and a plurality of turbine blades radially coupled to the outer surface of the turbine rotor disk. For each turbine stage, a plurality of turbine vanes are radially coupled to the inner surface of the turbine casing along the circumferential direction, and the turbine vanes are alternately arranged with the turbine blades. The turbine vanes guide the flow of the combustion gas passing through the turbine blades. Herein, the turbine casing and the turbine vanes may be collectively referred to as a "turbine stator" so as to be distinguished from the turbine rotor.

Figure 3:
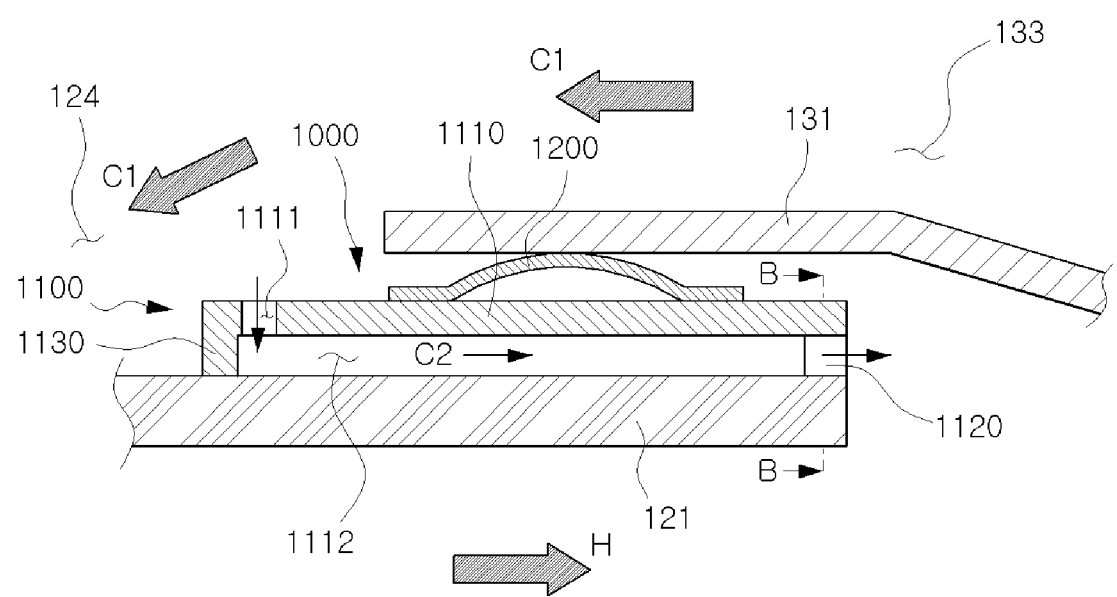
FIG. 3 is an enlarged view of a region A of FIG. 2, in which the view illustrates a liner cooling device installed between an inner liner and an inner transition piece.
Figure 4:
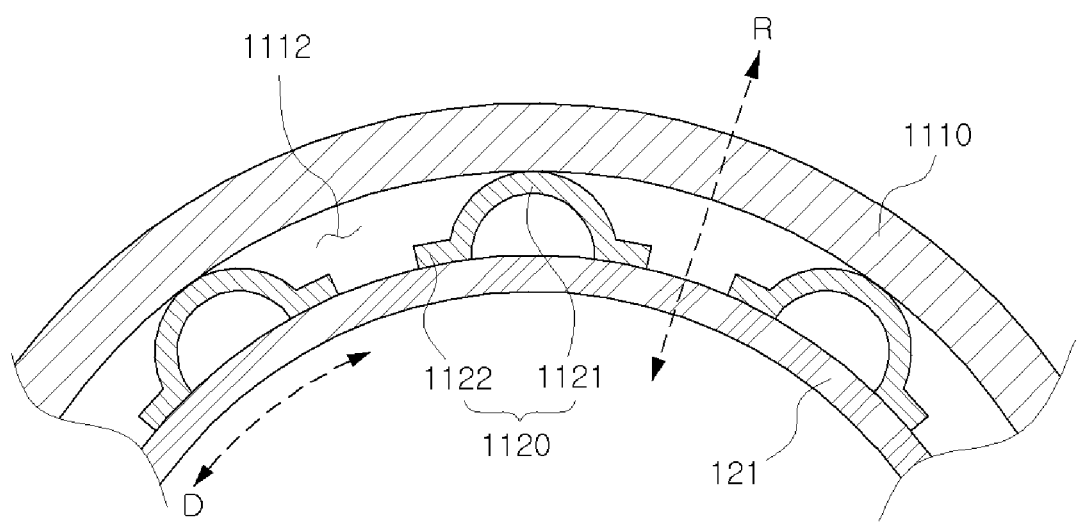
FIG. 4 is a cross-sectional view taken along line B-B of FIG. 3 and illustrates a first exemplary embodiment.
Figure 5:
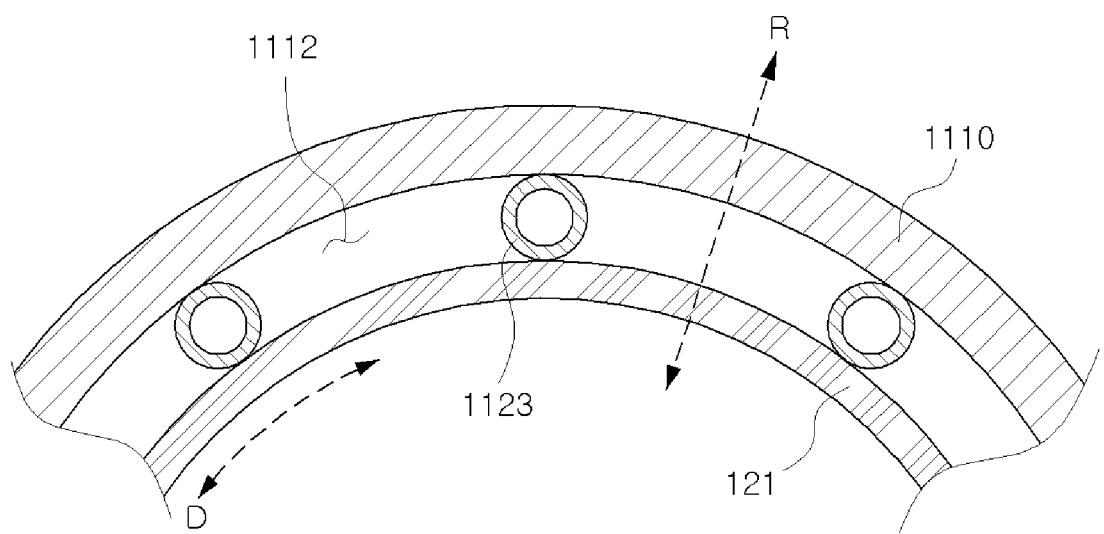
FIG. 5 is a view illustrating a second exemplary embodiment.
Figure 6:
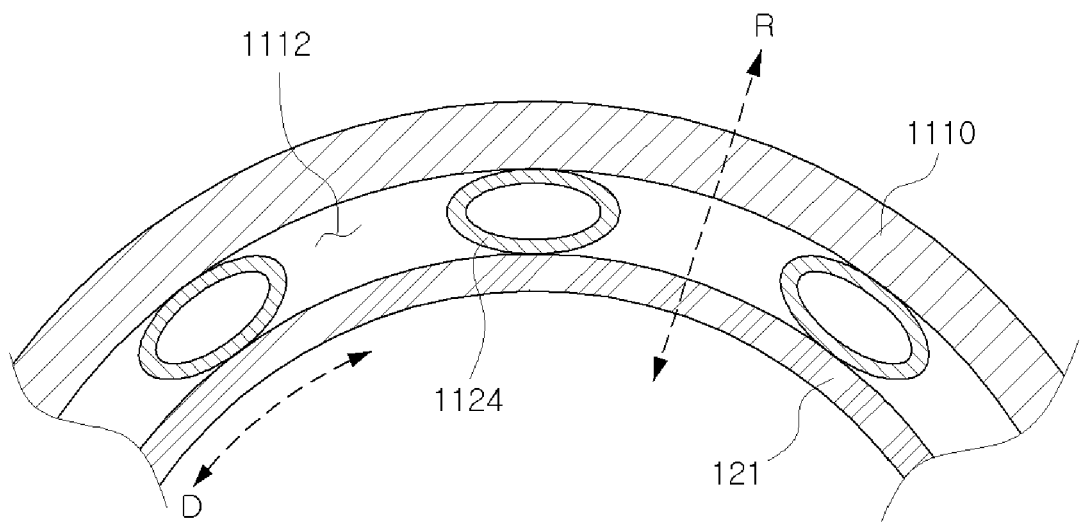
FIG. 6 is a view illustrating a third exemplary embodiment.

FIG. 3 is an enlarged view of a region A of FIG. 2, in which the view illustrates a liner cooling device installed between an inner liner and an inner transition piece, FIG. 4 is a cross-sectional view taken along line B-B of FIG. 3 and illustrates a first exemplary embodiment, FIG. 5 is a view illustrating a second exemplary embodiment, and FIG. 6 is a view illustrating a third exemplary embodiment.

Referring to FIGS. 3, the liner cooling device 1000 according to an exemplary embodiment is installed between the inner liner 121 and the inner transition piece 131 to cool the downstream end of the inner liner 121 based on the flow direction H of the combustion gas. In this case, cooling air may be compressed air supplied from the compressor 11 or air supplied from a separate air feeding means other than the compressor 11. Hereinafter, it is assumed that the cooling air is compressed air.

Here, the terms "upstream" and "downstream" are determined with respect to the flow direction H of the combustion gas flowing through the inner liner 121.

The liner cooling device 1000 includes a support portion 1100 and a sealing portion 1200.

The support portion 1100 is disposed between the inner liner 121 and the inner transition piece 131 and is provided with a cooling flow passage 1112 for discharging the compressed air supplied from the compressor 11 to the downstream side of the inner liner 121. To this end, the support portion 1100 includes a support member 1110, an auxiliary support member 1120, and a partition wall 1130.

The support member 1110 is formed in a hollow cylindrical shape and is disposed between the inner liner 121 and the inner transition piece 131. In detail, the support member 1110 is disposed radially outside the inner liner 121 and is spaced in a radial direction from the outer surface of the inner liner 121, thereby forming the cooling flow passage 1112 between the inner liner 121 and the support member 1110. The upstream end of the support member 1110 more protrudes outward than the upstream end of the inner transition piece 131. The support member 1110 has an inlet 1111 configured to communicate with the cooling flow passage 1112.

Compressed air C1 flowing from the annular transition piece flow passage 133 to the annular liner flow passage 124 is supplied to the cooling flow passage 1112 through the inlet 1111. The compressed air supplied to the cooling flow passage 1112 flows in a direction C2 that is the same direction as the flow direction H of the combustion gas and flows into the downstream end of the inner liner 121.

The auxiliary support member 1120 is installed between the support member 1110 and the inner liner 121 to support the support member 1110. The auxiliary support member 1120 is installed at an exit of the cooling flow passage 1112, that is, the downstream end of the cooling flow passage 1112, and the compressed air flowing through the cooling flow passage 1112 flows into the downstream end of the inner liner 121 through the auxiliary support member 1120.

The partition wall 1130 is installed in the cooling flow passage 1112 and is installed on an upstream side of the inlet 1111 to support the support member 1110. The partition wall 1130 seals the upstream end of the cooling flow passage 1112 so that the compressed air flowing into the cooling flow passage 1112 through the inlet 1111 flows only downstream (i.e., the direction C2).

The sealing portion 1200 is disposed between the support member 1110 and the inner transition piece 131 and disposed on a downstream side of the inlet 1111. The sealing portion 1200 has a shape in which an upstream half portion gradually expands outward in a radial direction and a downstream half portion gradually constricts inward in the radial direction in the downstream direction. Accordingly, the sealing portion 1200 seals a gap between the support portion 1100 and the inner transition piece 131, thereby preventing the compressed air flowing from the annular transition piece flow passage 133 to the annular liner flow passage 124 from passing through the gap between the support portion 1100 and the inner transition piece 131.

The auxiliary support member 1120 has a hole through which the compressed air can pass. Accordingly, the liner cooling device according to the exemplary embodiment can prevent the flow of compressed air discharged toward the downstream side of the inner liner 121 through the auxiliary support member 1120 from forming a vortex, and prevent the combustion gas from staying at a downstream end portion of the inner liner 121. In addition, the liner cooling device according to the exemplary embodiment can make the combustion gas easily move toward the transition piece 130 without staying at the downstream end of the inner liner 121 and can effectively cool the downstream end of the inner liner 121.

Referring to FIG. 4, the auxiliary support member 1120, when viewed in the flow direction H of the combustion gas, is formed in a convex shape (e.g., bulging outwardly in the radial direction R of the inner liner 121) to form a space between the inner liner 121 and the support portion 1100.

For example, the auxiliary support member 1120 includes a first support 1121 and a pair of second supports 1122. The first support 1121 is formed in a convex shape that bulges outward in the radial direction R of the inner liner 121 when viewed in the flow direction H of the combustion gas. The second supports 1122 are formed to extend from respective ends of the first support 1121 in opposite directions along a circumferential direction D of the inner liner 121, thereby supporting the first support 1121.

Referring to FIG. 5, the auxiliary support member 1123 has a circular hole when viewed in the flow direction H of the combustion gas.

Referring to FIG. 6, the auxiliary support member 1124, when viewed in the flow direction H of the combustion gas, has an elliptical hole such that minor axes of the respective elliptical holes are aligned along the radial direction R of the inner liner 121. The minor axis of an ellipse is a straight line that intersects the major axis and is shorter than the major axis.

As described above, because the auxiliary support members 1120, 1123, and 1124 have various shapes with a hole, it is possible to prevent the flow of compressed air discharged toward the downstream side of the inner liner 121 through the auxiliary support member from forming a vortex, and it is possible to prevent the combustion gas from staying at the downstream end of the inner liner 121.

Figure 7:
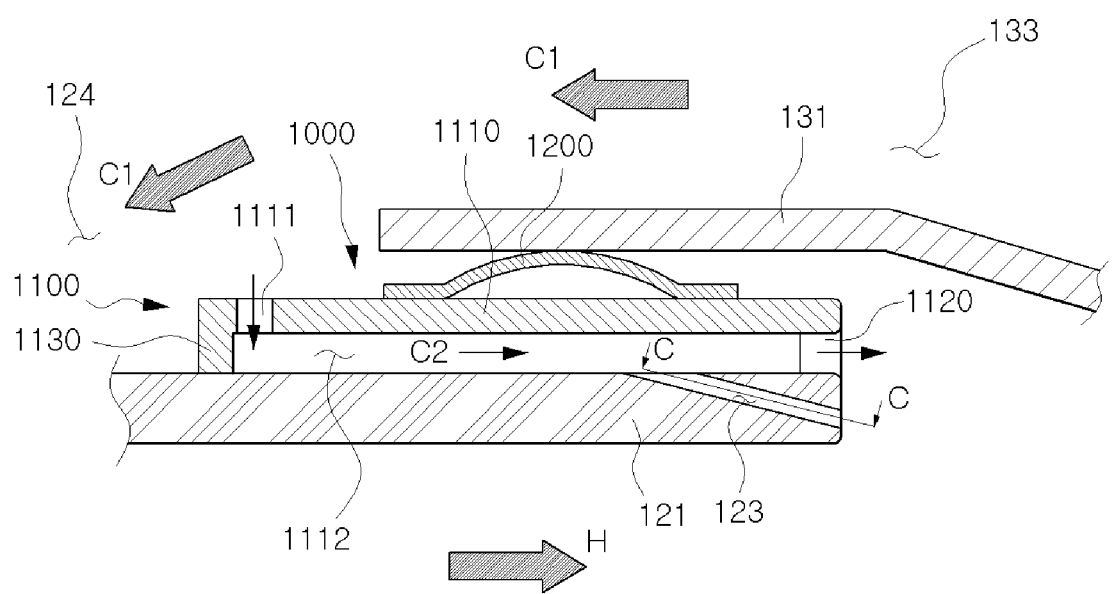
FIG. 7 is an enlarged view of the region A of FIG. 2 and illustrates a fourth exemplary embodiment.
Figure 8:
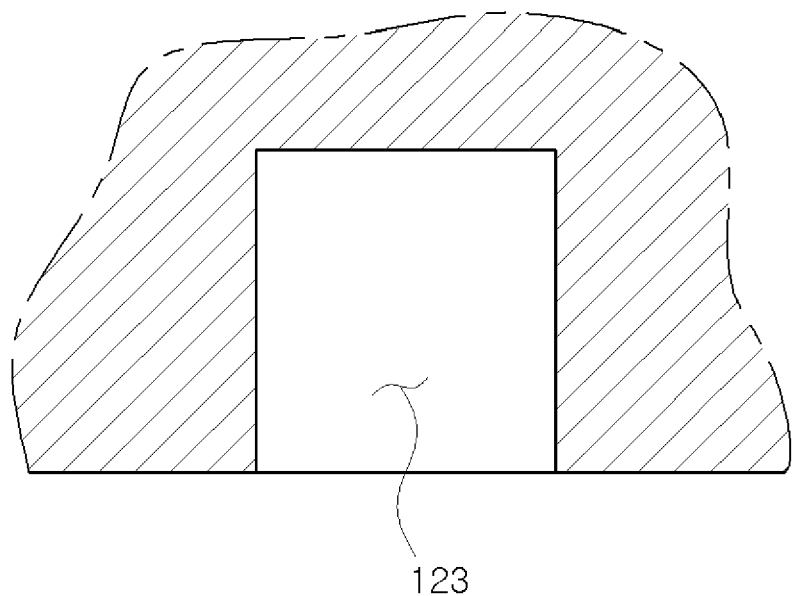
FIG. 8 is a cross-sectional view taken along line C-C of FIG. 7.
Figure 9:
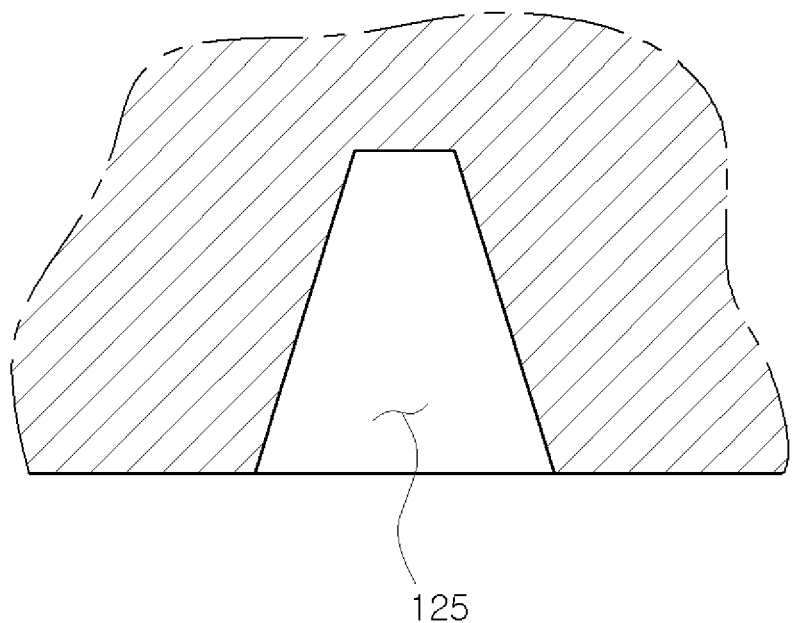
FIG. 9 is a view illustrating a fifth exemplary embodiment.
Figure 10:
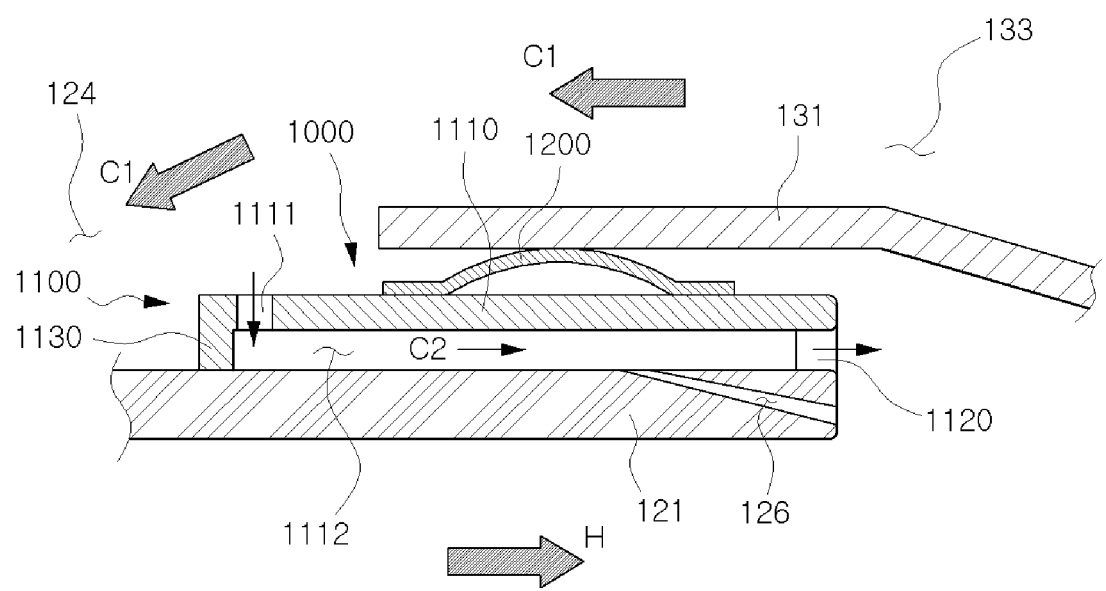
FIG. 10 is a view illustrating a sixth exemplary embodiment.

FIG. 7 is an enlarged view of the region A of FIG. 2 and illustrates a fourth exemplary embodiment, FIG. 8 is a cross-sectional view taken along line C-C of FIG. 7, FIG. 9 is a view illustrating a fifth exemplary embodiment, and FIG. 10 is a view illustrating a sixth exemplary embodiment.

Referring to FIGS. 7 and 8, the inner liner 121 is provided with an auxiliary discharge flow passage 123 of which an end communicates with the cooling flow passage 1112 and an opposite end communicates with the downstream end of the inner liner 121. The auxiliary discharge flow passage 123 is inclined from the upstream end to the downstream end thereof. That is, the auxiliary discharge flow passage 123 obliquely extends through the inner liner 121 from the inner surface to the outer surface.

Accordingly, the auxiliary discharge flow passage 123 receives a portion of the compressed air C2 flowing along the cooling flow passage 1112 and discharges it toward the downstream side of the inner liner 121. Therefore, the combustion gas at the downstream end of the inner liner 121 is pushed toward the downstream side so that the combustion gas can easily flow from the inner transition piece 131 to the turbine 12.

Referring to FIG. 9, the auxiliary discharge flow passage 125 is formed such that a width thereof in the circumferential direction D of the inner liner 121 gradually increases from the upstream side to the downstream side.

Referring to FIG. 10, the auxiliary discharge flow passage 126 is formed such that a width thereof in the radial direction R of the inner liner 121 gradually increases from the upstream side to the downstream side.

Because the auxiliary discharge flow passage 123, 125, and 126 may be designed to have various shapes, it is possible to facilitate the flow of the combustion gas toward the transition piece 130 from the downstream end of the inner liner 121 and it is possible to effectively cool the downstream end of the inner liner 121.

While one or more exemplary embodiments have been described with reference to the accompanying drawings, it will be apparent to those skilled in the art that various variations and modifications may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A liner cooling device comprising:
   a support portion disposed between a liner and a transition piece of a gas turbine and configured to include a cooling flow passage through which cooling air moves to the transition piece,
   wherein the support portion includes:
   a support member formed in a hollow cylindrical shape, disposed between the liner and the transition piece, and provided with an inlet communicating with the cooling flow passage;
   a partition wall installed at an upstream end of the cooling flow passage, configured to support the support member, and formed to seal the upstream end of the cooling flow passage; and
   an auxiliary support member having a hole therein along a flow direction of combustion gas, and disposed between the support member and the liner to support the support member by contacting an outer circumferential surface of the liner and an inner circumferential surface of the support member in the cooling flow passage, wherein the cooling air supplied from the inlet passes both through the hole and outside of the auxiliary support member along the flow direction of combustion gas into the transition piece,
   wherein the liner includes a downstream side surface extending in a radial direction from the outer circumferential surface of the liner to an inner circumferential surface of the liner,
   wherein the liner further includes an auxiliary discharge flow passage communicating with the cooling flow passage, the auxiliary discharge flow passage extending from an auxiliary inlet in the outer circumferential surface of the liner to an auxiliary outlet in the downstream side surface, and wherein the auxiliary outlet and an outlet of the hole are located in a same plane.

2. The device according to claim 1,
   wherein the liner comprises:

an inner liner which includes the outer circumferential surface of the liner and the inner circumferential surface of the liner; and an outer liner disposed outside the inner liner in the radial direction and configured to surround the inner liner such that an air channel is defined between the inner liner and the outer liner to allow the cooling air to flow in a direction opposite to the flow direction of combustion gas, wherein the transition piece comprises:

an inner transition piece having an upstream end disposed outside a downstream end of the inner liner in the radial direction based on the flow direction of the combustion gas; and an outer transition piece disposed outside the inner transition piece in the radial direction and coupled to the outer liner such that a transition piece air channel is defined between the inner transition piece and the outer transition piece to allow the cooling air to flow toward the air channel, and wherein the support portion is disposed between the downstream end of the inner liner and the upstream end of the inner transition piece in the flow direction of the combustion gas.

3. The device according to claim 1, wherein the support member is spaced from the outer circumferential surface of the liner in the radial direction to define the cooling flow passage between the support member and the liner.

4. The device according to claim 3, wherein an upstream end of the support member based on the flow direction of the combustion gas protrudes more upstream than an end portion of the transition piece, the partition wall is installed at an upstream side of the inlet of the cooling flow passage, and the auxiliary support member is installed at a downstream end of the cooling flow passage.

5. The device according to claim 4, further comprising a sealing portion disposed between the support member and the transition piece and positioned at a downstream side of the inlet based on the flow direction of the combustion gas.

6. The device according to claim 1, wherein the auxiliary support member is formed to protrude radially outward from the liner when viewed in the flow direction of the combustion gas to form a space between the auxiliary support member and the liner.

7. The device according to claim 1, wherein the auxiliary support member comprises:

a first support protruding radially outward from the liner when viewed in the flow direction of the combustion gas; and a pair of second supports extending in opposite directions from each end of the first support along a circumferential direction of the liner.

8. The device according to claim 1, wherein the hole is a circular hole when viewed in the flow direction of the combustion gas.

9. The device according to claim 1, wherein the hole is an elliptical hole when viewed in the flow direction of the combustion gas and a minor axis of the elliptical hole is aligned along the radial direction of the liner.

10. The device according to claim 1, wherein the auxiliary discharge flow passage is formed such that a width thereof in a circumferential direction of the liner increases from an upstream end of the auxiliary discharge flow passage to a downstream end of the auxiliary discharge flow passage in the flow direction of the combustion gas.

11. The device according to claim 1, wherein the auxiliary discharge flow passage is formed such that a width thereof in the radial direction of the liner increases from an upstream end of the auxiliary discharge flow passage to a downstream end of the auxiliary discharge flow passage in the flow direction of the combustion gas.

12. A combustor comprising:

a nozzle configured to inject fuel to mix with compressed air supplied from a compressor of a gas turbine;

a liner coupled to the nozzle and configured to combust a mixture of the fuel and the compressed air;

a transition piece coupled to the liner and configured to pass combustion gas generated in the liner; and a liner cooling device installed at a joint portion between the liner and the transition piece to cool the liner, wherein the liner cooling device includes a support portion disposed between the liner and the transition piece and configured to include a cooling flow passage through which cooling air moves to the transition piece, and wherein the support portion includes:

a support member formed in a hollow cylindrical shape, disposed between the liner and the transition piece, and provided with an inlet communicating with the cooling flow passage;

a partition wall installed at an upstream end of the cooling flow passage, configured to support the support member, and formed to seal the upstream end of the cooling flow passage; and an auxiliary support member having a hole therein along a flow direction of combustion gas, and disposed between the support member and the liner to support the support member by contacting an outer circumferential surface of the liner and an inner circumferential surface of the support member in the cooling flow passage, wherein the cooling air supplied from the inlet passes both through the hole and outside of the auxiliary support member along the flow direction of combustion gas into the transition piece, wherein the liner includes a downstream side surface extending in a radial direction from the outer circumferential surface of the liner to an inner circumferential surface of the liner, wherein the liner further includes an auxiliary discharge flow passage communicating with the cooling flow passage, the auxiliary discharge flow passage extending from an auxiliary inlet in the outer circumferential surface of the liner to an auxiliary outlet in the downstream side surface, and wherein the auxiliary outlet and an outlet of the hole are located in a same plane.

13. The combustor according to claim 12, wherein the liner includes an inner liner which includes the outer circumferential surface of the liner and the inner circumferential surface of the liner and an outer liner disposed outside the inner liner in the radial direction and configured to surround the inner liner such that an air channel is defined between the inner liner and the outer liner to allow the cooling air to flow in a direction opposite to the flow direction of combustion gas, wherein the transition piece comprises:

an inner transition piece having an upstream end disposed outside a downstream end of the inner liner in the radial direction based on the flow direction of the combustion gas; and an outer transition piece disposed outside the inner transition piece in the radial direction and coupled to the outer liner to define a transition piece air channel through which the cooling air flows toward the air channel, and wherein the support portion is disposed between the downstream end of the inner liner and the upstream end of the inner transition piece in the flow direction of the combustion gas.

14. The combustor according to claim 12, wherein the support member is spaced from the outer circumferential surface of the liner in the radial direction to define the cooling flow passage between the support member and the liner.

15. The combustor according to claim 14, wherein an upstream end of the support member based on the flow direction of the combustion gas protrudes more upstream than an end portion of the transition piece, the partition wall is installed at an upstream side of the inlet of the cooling flow passage, and the auxiliary support member is installed at a downstream end of the cooling flow passage.

16. The combustor according to claim 15, wherein the liner cooling device further comprises a sealing portion disposed between the support member and the transition piece and positioned at a downstream side of the inlet based on the flow direction of the combustion gas.

17. The combustor according to claim 12, wherein the auxiliary support member is formed to protrude radially outward when viewed in the flow direction of the combustion gas to form a space between the auxiliary support member and the liner.

18. A gas turbine comprising:

a compressor configured to compress air introduced from an outside;

a combustor configured to mix fuel with the air compressed by the compressor and combust a mixture of the fuel and the compressed air; and a turbine configured to generate a driving force to generate electric power by combustion gas supplied from the combustor, wherein the combustor comprises:

a nozzle configured to inject fuel to mix with compressed air supplied from the compressor;

a liner coupled to the nozzle and configured to combust the mixture of the fuel and the compressed air;

a transition piece coupled to the liner and configured to pass combustion gas generated in the liner; and a liner cooling device installed at a joint portion between the liner and the transition piece to cool the liner, wherein the liner cooling device includes a support portion disposed between the liner and the transition piece and configured to include a cooling flow passage through which cooling air moves to the transition piece, and wherein the support portion includes:

a support member formed in a hollow cylindrical shape, disposed between the liner and the transition piece, and provided with an inlet communicating with the cooling flow passage;

a partition wall installed at an upstream end of the cooling flow passage, configured to support the support member, and formed to seal the upstream end of the cooling flow passage; and an auxiliary support member having a hole therein along a flow direction of combustion gas, and disposed between the support member and the liner to support the support member by contacting an outer circumferential surface of the liner and an inner circumferential surface of the support member in the cooling flow passage, wherein the cooling air supplied from the inlet passes both through the hole and outside of the auxiliary support member along the flow direction of combustion gas into the transition piece, wherein the liner includes a downstream side surface extending in a radial direction from the outer circumferential surface of the liner to an inner circumferential surface of the liner, wherein the liner further includes an auxiliary discharge flow passage communicating with the cooling flow passage, the auxiliary discharge flow passage extending from an auxiliary inlet in the outer circumferential surface of the liner to an auxiliary outlet in the downstream side surface, and wherein the auxiliary outlet and an outlet of the hole are located in a same plane.

* * * * *